United States Patent
Dong et al.

(10) Patent No.: US 10,812,218 B2
(45) Date of Patent: Oct. 20, 2020

(54) METHOD FOR DETERMINING TRANSMISSION RATE SUPPORTED BY DATA STREAM, USER EQUIPMENT, AND BASE STATION

(71) Applicant: HUAWEI TECHNOLOGIES CO., LTD., Shenzhen, Guangdong (CN)

(72) Inventors: Chen Dong, Beijing (CN); Xiaodong Sun, Shenzhen (CN); Yanliang Sun, Shenzhen (CN); Jian Wang, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 16/305,949

(22) PCT Filed: May 31, 2016

(86) PCT No.: PCT/CN2016/084180
§ 371 (c)(1),
(2) Date: Nov. 30, 2018

(87) PCT Pub. No.: WO2017/206077
PCT Pub. Date: Dec. 7, 2017

(65) Prior Publication Data
US 2019/0149263 A1    May 16, 2019

(51) Int. Cl.
*H04B 7/00*    (2006.01)
*H04L 1/00*    (2006.01)
(Continued)

(52) U.S. Cl.
CPC .............. *H04L 1/0026* (2013.01); *H04L 1/00* (2013.01); *H04L 1/0005* (2013.01);
(Continued)

(58) Field of Classification Search
CPC ... H04W 72/02; H04W 72/048; H04W 72/12; H04W 72/1226
(Continued)

(56) References Cited

U.S. PATENT DOCUMENTS 7,885,202 B2 * 2/2011 Li .................. H04L 5/0094
370/252
7,903,582 B2 * 3/2011 Yoon ................ H04L 5/00
370/235
(Continued)

FOREIGN PATENT DOCUMENTS

CN    101640656 A    2/2010
CN    101931494 A    12/2010
(Continued)

OTHER PUBLICATIONS

3GPP TS 36.213 V127.0 (Sep. 2015),3rd Generation Partnership Project;Technical Specification Group Radio Access Network;Evolved Universal Terrestrial Radio Access (E-UTRA);Physical layer procedures(Release 12), Sep. 2015. total 241 pages.
(Continued)

*Primary Examiner* — Dmitry Levitan
(74) *Attorney, Agent, or Firm* — Fish & Richardson P.C.

(57) ABSTRACT

Embodiments of the present invention provide a method for determining a transmission rate supported by a data stream, user equipment, and a base station. The method includes: determining, by user equipment UE, a first index corresponding to an average transmission rate supported by a channel between the UE and the base station; determining, by the UE, a second index corresponding to a difference between an instantaneous transmission rate supported by a data stream on the channel and an average transmission rate supported by the data stream on the channel; sending, by the UE, the first index to the base station; and sending, by the UE, the second index to the base station. According to the
(Continued)

embodiments of the present invention, the instantaneous transmission rate supported by the data stream on the channel can be relatively accurately fed back to the base station, thereby improving channel resource utilization.

17 Claims, 3 Drawing Sheets

(51) Int. Cl.
| | | |
|---|---|---|
| H04L 5/00 | (2006.01) | |
| H04L 27/34 | (2006.01) | |
| H04B 7/0413 | (2017.01) | |
| H04B 7/0426 | (2017.01) | |

(52) U.S. Cl.
CPC .......... *H04L 1/0029* (2013.01); *H04L 5/0057* (2013.01); *H04L 27/34* (2013.01); *H04B 7/0413* (2013.01); *H04B 7/0434* (2013.01); *H04L 1/0003* (2013.01); *H04L 1/0009* (2013.01)

(58) Field of Classification Search
USPC .................. 370/310, 328, 329, 464, 465
See application file for complete search history.

(56) References Cited

U.S. PATENT DOCUMENTS

| | | | | |
|---|---|---|---|---|
| 8,111,764 B2* | 2/2012 | Chun | ............... | H04L 1/0029 |
| | | | | 370/252 |
| 8,400,928 B2* | 3/2013 | Choi | ............... | H04L 1/0029 |
| | | | | 370/241 |
| 8,599,947 B2* | 12/2013 | Chun | ............... | H04B 7/063 |
| | | | | 375/267 |
| 8,670,343 B2* | 3/2014 | Nammi | ............ | H04L 1/0027 |
| | | | | 370/252 |
| 9,240,859 B2* | 1/2016 | Wang | ............... | H04L 1/0026 |
| 9,294,220 B2* | 3/2016 | Brannstrom | ....... | H04L 1/0026 |
| 2006/0233131 A1 | 10/2006 | Gore et al. | | |
| 2007/0066242 A1* | 3/2007 | Yi | ............... | H04B 17/382 |
| | | | | 455/69 |
| 2008/0101407 A1* | 5/2008 | Khan | ............... | H04L 1/0026 |
| | | | | 370/468 |
| 2008/0229177 A1 | 9/2008 | Kotecha | | |
| 2009/0060010 A1* | 3/2009 | Maheshwari | ......... | H04L 1/0029 |
| | | | | 375/211 |
| 2009/0130985 A1* | 5/2009 | Lee | ............... | H04L 27/2608 |
| | | | | 455/67.11 |
| 2010/0034093 A1* | 2/2010 | Roh | ............... | H04B 7/0417 |
| | | | | 370/241 |
| 2011/0064153 A1* | 3/2011 | Khan | ............... | H04L 1/0026 |
| | | | | 375/260 |
| 2011/0299626 A1 | 12/2011 | Kim | | |
| 2013/0114751 A1 | 5/2013 | Nagata et al. | | |
| 2014/0241289 A1 | 8/2014 | Khan | | |
| 2018/0167954 A1 | 6/2018 | Wakabayashi | | |
| 2020/0008104 A1* | 1/2020 | Dong | ............... | H04W 28/22 |

FOREIGN PATENT DOCUMENTS

| | | |
|---|---|---|
| CN | 102237950 A | 11/2011 |
| CN | 102291216 A | 12/2011 |
| CN | 104969505 A | 10/2015 |

OTHER PUBLICATIONS

International Search Report and Written Opinion issued in International Application No. PCT/CN2016/084180 dated Feb. 9, 2017, 21 pages.

R1-164867 Huawei, HiSilicon,"CQI feedback overhead reduction in short TTI," 3GPP TSG RAN WG1 Meeting #85, Nanjing, China, May 23-27, 2016, 5 pages.

Extended European Search Report issued in European Application No. 16903462.6 dated Apr. 3, 2019, 11 pages.

Office Action issued in Chinese Application No. 201680085678.1 dated Dec. 2, 2019, 22 pages (with English translation).

\* cited by examiner

METHOD FOR DETERMINING TRANSMISSION RATE SUPPORTED BY DATA STREAM, USER EQUIPMENT, AND BASE STATION

CROSS-REFERENCE TO RELATED APPLICATIONS

This application is a national stage of International Application No. PCT/CN2016/084180, filed on May 31, 2016, which is hereby incorporated by reference in its entirety.

TECHNICAL FIELD

The present invention relates to the communications field, and more specifically, to a method for determining a transmission rate supported by a data stream, user equipment, and a base station.

BACKGROUND

A table of correspondences between values of channel quality indicator (Channel Quality Indicator, CQI) indexes, modulation schemes, and transmission rates is provided in 3GPP R12 TS36.213. As shown in Table 1, a value of a CQI index ranges from 0 to 15 (each CQI occupies 4 bits, and there are altogether 16 levels in the table), modulation schemes include QPSK, 16QAM, and 64QAM, and a transmission rate ranges from 0 to 5.5547.

TABLE 1

| CQI | Modulation scheme | Code rate × 1024 | Rate |
| --- | --- | --- | --- |
| 0 | — | — | — |
| 1 | QPSK | 78 | 0.1523 |
| 2 | QPSK | 120 | 0.2344 |
| 3 | QPSK | 193 | 0.377 |
| 4 | QPSK | 308 | 0.6016 |
| 5 | QPSK | 449 | 0.877 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

In the prior art, when user equipment (User Equipment, UE) communicates with a base station, the UE detects quality of a channel and obtains through conversion an instantaneous transmission rate m supported by the channel, and then determines, based on Table 1, a CQI index corresponding to a rate less than or equal to m and closest to m, and feeds back the CQI index to the base station. After receiving the CQI index fed back by the UE, the base station queries Table 1 to determine a modulation scheme and a transmission rate that correspond to the CQI index, and then transmits data to the UE by using the corresponding modulation scheme at the corresponding transmission rate. Specifically, if the UE detects that the instantaneous transmission rate supported by the channel is 0.8, two rates closest to the rate of 0.8 in Table 1 are respectively a rate of 0.6016 corresponding to a CQI index of 4 and a rate of 0.877 corresponding to a CQI index of 5. During a feedback, only a principle of selecting a smaller value instead of a larger value can be used. Therefore, the UE feeds back the CQI=4 to the base station. After receiving the CQI index sent by the UE, the base station determines, based on Table 1, that the rate corresponding to the CQI=4 is 0.6016, and a modulation scheme corresponding to the CQI=4 is QPSK. Then, the base station sends data to the UE by using the modulation scheme of QPSK at the rate of 0.6016. In the prior art, usually, the UE periodically feeds back a CQI index (for example, a period of 10 ms) to the base station, and the base station determines, based on the received CQI index, a modulation scheme and a rate for sending data to the UE.

Due to impact of factors such as fading and a shadow effect that change relatively fast, the quality of the channel is always in a fluctuating state. Consequently, the instantaneous transmission rate supported by the channel and measured by the UE also fluctuates within a range. However, levels of CQI indexes are limited (as shown in Table 1, there are altogether 16 levels of CQIs). In this way, when feeding back a CQI index, sometimes it is very difficult for the UE to find a CQI index corresponding to a rate relatively close to the instantaneous transmission rate supported by the channel. Therefore, within a period, a manner in which the UE feeds back one CQI index to the base station cannot accurately reflect the instantaneous transmission rate supported by the channel, leading to a waste of channel resources.

SUMMARY

According to a first aspect, a method for determining a transmission rate of a data stream is provided. The method includes: determining, by user equipment UE, a first index corresponding to an average transmission rate supported by a channel between the UE and the base station; determining, by the UE, a second index corresponding to a difference between an instantaneous transmission rate supported by a data stream on the channel and an average transmission rate supported by the data stream on the channel; sending, by the UE, the first index to the base station; and sending, by the UE, the second index to the base station.

In the prior art, a CQI index fed back by UE to a base station corresponds to an instantaneous transmission rate supported by a data stream on a current channel. Because a transmission rate actually supported by the data stream has a relatively large fluctuation range, and a CQI index occupies a limited quantity of bits, it is very difficult for the UE to select a suitable CQI index based on quality of the channel to feed back to the base station, to be specific, it is difficult for the UE to select, from limited CQI indexes, a CQI index matching actual quality of the channel to feed back to the base station. A feedback effect is poor. However, in the present invention, the UE sends the first index and the second index, to separately feed back the average transmission rate supported by the channel, and the difference between the instantaneous transmission rate supported by the data stream on the channel and the average transmission rate supported by the data stream on the channel to the base station, so that the instantaneous transmission rate supported by the data stream on the channel can be relatively accurately fed back to the base station, thereby improving channel resource utilization.

The average transmission rate supported by the channel may be an average transmission rate supported by all data streams on the channel. When there is only one data stream on the channel, the average transmission rate supported by the channel is the same as an average transmission rate supported by the data stream on the channel. When there are two data streams in total on the channel, the average transmission rate supported by the channel may be a sum of average transmission rates supported by the two data streams on the channel. An average transmission rate supported by a data stream on the channel is an average transmission rate supported by either of the two data streams. The instantaneous transmission rate supported by the data stream on the channel is an instantaneous transmission rate supported by either of the two data streams. An average transmission rate supported by each data stream may be determined based on a correspondence between the average transmission rate supported by the channel and the average transmission rate supported by the data stream on the channel. In addition, when the average transmission rate supported by the channel is defined, an average transmission rate supported by any data stream on the channel may be defined as the average transmission rate supported by the channel. For example, when the channel includes two data streams, an average transmission rate supported by a first data stream may be defined as the average transmission rate supported by the channel. In this way, after obtaining the average transmission rate supported by the channel, the base station may directly determine an average transmission rate supported by the first stream, and then, determine, based on a relationship between the average transmission rate supported by the first data stream and an average transmission rate supported by a second data stream, the average transmission rate supported by the second data stream. Alternatively, other indicators indicating the average transmission rate supported by the channel may be defined as the average transmission rate supported by the channel, and the base station may determine, according to these indicators indicating the average transmission rate supported by the channel, an average transmission rate supported by each data stream.

With reference to the first aspect, in a first implementation of the first aspect, the determining, by user equipment UE, a first index corresponding to an average transmission rate supported by a channel between the UE and the base station includes: determining, by the UE based on a first relationship table, that a CQI index corresponding to the average transmission rate supported by the channel is the first index, where the first relationship table is used to indicate a correspondence between the average transmission rate supported by the channel and a CQI index.

With reference to the first aspect, in a second implementation of the first aspect, the determining, by the UE, a second index corresponding to a difference between an instantaneous transmission rate supported by a data stream on the channel and an average transmission rate supported by the data stream on the channel includes: determining, by the UE based on a second relationship table, that a CQI index corresponding to the difference between the instantaneous transmission rate supported by the data stream on the channel and the average transmission rate supported by the data stream on the channel is the second index, where the second relationship table is used to indicate a correspondence between the difference between the instantaneous transmission rate supported by the data stream on the channel and the average transmission rate supported by the data stream on the channel and a CQI index.

With reference to any one of the first aspect and the first and second implementations of the first aspect, in a third implementation of the first aspect, the channel includes a plurality of data streams, the plurality of data streams are in a one-to-one correspondence with a plurality of second indexes, and the sending, by the UE, the second index to the base station includes: sending, by the UE, a second index corresponding to each of the plurality of data streams on the channel to the base station.

With reference to the third implementation of the first aspect, in a fourth implementation of the first aspect, the plurality of data streams include a first data stream and a second data stream, and the sending, by the UE, the second index to the base station includes: sending, by the UE, a second index corresponding to the first data stream to the base station, where the second index corresponding to the first data stream is used to indicate a CQI index corresponding to a difference between an instantaneous transmission rate supported by the first data stream and an average transmission rate supported by the first data stream; and sending, by the UE, a second index corresponding to the second data stream to the base station, where the second index corresponding to the second data stream is used to indicate a CQI index corresponding to a difference between an instantaneous transmission rate supported by the second data stream and an average transmission rate supported by the second data stream.

With reference to the second implementation of the first aspect, in a fifth implementation of the first aspect, the channel includes N data streams, where an eigenvalue corresponding to an $(N-1)^{th}$ data stream is greater than an eigenvalue corresponding to an $N^{th}$ data stream, where N is an integer greater than 1, and the determining, by the UE based on a second relationship table, that a CQI index corresponding to the difference between the instantaneous transmission rate supported by the data stream on the channel and the average transmission rate supported by the data stream on the channel is the second index includes: determining, by the UE based on a second index corresponding to at least one of a first data stream to the $(N-1)^{th}$ data stream, a fluctuation range of a difference between an instantaneous transmission rate supported by the $N^{th}$ data stream and an average transmission rate supported by the $N^{th}$ data stream; and determining, by the UE within the fluctuation range of the difference, that a CQI index corresponding to the $N^{th}$ data stream is a second index corresponding to the $N^{th}$ data stream.

With reference to any one of the first aspect and the first to fifth implementations of the first aspect, in a sixth implementation of the first aspect, a quantity of bits occupied by the second index is less than or equal to a quantity of bits occupied by the first index.

With reference to the sixth implementation of the first aspect, in a seventh implementation of the first aspect, the quantity of bits occupied by the second index is less than 4, and the quantity of bits occupied by the first index is greater than or equal to 4.

With reference to any one of the first aspect and the first to seventh implementations of the first aspect, in an eighth implementation of the first aspect, a sending period of the first index is greater than a sending period of the second index.

With reference to any one of the first aspect and the first to seventh implementations of the first aspect, in a ninth implementation of the first aspect, when a change in the average rate supported by the channel exceeds a preset threshold, the UE re-sends the first index to the base station.

According to a second aspect, a method for determining a transmission rate of a data stream is provided. The method includes: receiving, by a base station, a first index sent by user equipment UE, where the first index is used to indicate an average transmission rate supported by a channel between the UE and the base station; receiving, by the base station, a second index sent by the UE, where the second index is used to indicate a difference between an instantaneous transmission rate supported by a data stream on the channel and an average transmission rate supported by the data stream on the channel; and determining, by the base station based on the first index and the second index, the instantaneous transmission rate supported by the data stream on the channel.

In the present invention, the UE sends the first index and the second index, to separately feed back the average transmission rate supported by the channel, and the difference between the instantaneous transmission rate supported by the data stream on the channel and the average transmission rate supported by the data stream on the channel to the base station, so that the instantaneous transmission rate supported by the data stream on the channel can be relatively accurately fed back to the base station, thereby improving channel resource utilization.

With reference to the second aspect, in a first implementation of the second aspect, the first index is a CQI index corresponding to the average transmission rate supported by the channel, and the second index is a CQI index corresponding to the difference between the instantaneous transmission rate supported by the data stream on the channel and the average transmission rate supported by the data stream on the channel.

With reference to the second aspect or the first implementation of the second aspect, in a second implementation of the second aspect, the channel includes a plurality of data streams, the plurality of data streams are in a one-to-one correspondence with a plurality of second indexes, and the receiving, by the base station, a second index sent by the UE includes: receiving, by the base station, a second index corresponding to each of the plurality of data streams on the channel and sent by the UE.

With reference to the second implementation of the second aspect, in a third implementation of the second aspect, the plurality of data streams include a first data stream and a second data stream, and the receiving, by the base station, a second index sent by the UE includes: receiving, by the base station, a second index corresponding to the first data stream and sent by the UE, where the second index corresponding to the first data stream is used to indicate a CQI index corresponding to a difference between an instantaneous transmission rate supported by the first data stream and an average transmission rate supported by the first data stream; and receiving, by the base station, a second index corresponding to the second data stream and sent by the UE, where the second index corresponding to the second data stream is used to indicate a CQI index corresponding to a difference between an instantaneous transmission rate supported by the second data stream and an average transmission rate supported by the second data stream.

With reference to the third implementation of the second aspect, in a fourth implementation of the second aspect, the determining, by the base station based on the first index and the second index, the instantaneous transmission rate supported by the data stream on the channel includes: determining, by the base station based on the first index, the average transmission rate supported by the channel; determining, by the base station based on the average transmission rate supported by the channel, the average transmission rate supported by the first data stream and the average transmission rate supported by the second data stream; determining, by the base station based on the second index corresponding to the first data stream, that the difference between the instantaneous transmission rate supported by the first data stream and the average transmission rate supported by the first data stream is a first difference; determining, by the base station based on the second index corresponding to the second data stream, that the difference between the instantaneous transmission rate supported by the second data stream and the average transmission rate supported by the second data stream is a second difference; determining, by the base station based on the average transmission rate supported by the first data stream and the first difference, the instantaneous transmission rate supported by the first data stream; and determining, by the base station based on the average transmission rate supported by the second data stream and the second difference, the instantaneous transmission rate supported by the second data stream.

With reference to any one of the second aspect and the first to fourth implementations of the second aspect, in a fifth implementation of the second aspect, a quantity of bits occupied by the second index is less than or equal to a quantity of bits occupied by the first index.

With reference to the fifth implementation of the second aspect, in a sixth implementation of the second aspect, the quantity of bits occupied by the second index is less than 4, and the quantity of bits occupied by the first index is greater than or equal to 4.

With reference to any one of the second aspect and the first to sixth implementations of the second aspect, in a seventh implementation of the second aspect, a period of receiving the first index by the base station is greater than a period of receiving the second index by the base station.

According to a third aspect, user equipment is provided. The user equipment includes modules configured to perform the method according to the first aspect.

According to a fourth aspect, a base station is provided. The base station includes modules configured to perform the method according to the second aspect.

In some of the foregoing implementations, the first index, and a second index corresponding to the data stream on the channel are sent to the base station by using a physical uplink control channel PUCCH or a physical uplink shared channel PUSCH.

In some of the foregoing implementations, when the channel between the UE and the base station includes only one data stream, the first index is used to indicate a CQI index corresponding to the average transmission rate supported by the first data stream.

In some of the foregoing implementations, when the channel between the UE and the base station includes a plurality of data streams, the first index is used to indicate a CQI index corresponding to an average transmission rate supported by the plurality of data streams on the channel.

In some of the foregoing implementations, the determining, by the base station based on the first index, the average transmission rate supported by the first data stream and the average transmission rate supported by the second data stream includes: querying, by the base station based on the first index, a table of a correspondence between the average transmission rate supported by the channel and a CQI index, to obtain the average transmission rate supported by the channel; and determining, by the base station based on a correspondence between the average transmission rate supported by the channel, the first data stream, and the second data stream, the average transmission rate supported by the first data stream and the average transmission rate supported by the second data stream.

In some of the foregoing implementations, the determining, by the base station based on the average transmission rate supported by the first data stream and the second index corresponding to the first data stream, an instantaneous transmission rate supported by the first data stream includes: querying, by the base station based on the second index corresponding to the first data stream, a table of a correspondence between a difference between the instantaneous transmission rate supported by the first data stream and the first data stream, and a CQI index, to obtain the instantaneous transmission rate supported by the first data stream.

In some of the foregoing implementations, the determining, by the base station based on the average transmission rate supported by the second data stream and the second index corresponding to the second data stream, an instantaneous transmission rate supported by the second data stream includes: querying, by the base station based on the second index corresponding to the second data stream, a table of a correspondence between a difference between the instantaneous transmission rate supported by the second data stream and the second data stream, and a CQI index, to obtain the instantaneous transmission rate supported by the second data stream.

In some of the foregoing implementations, after the obtaining the instantaneous transmission rate supported by the first data stream, the method further includes: querying, by the base station based on the instantaneous transmission rate supported by the first data stream, a table of a correspondence between an instantaneous transmission rate supported by a data stream, a modulation scheme, and a code rate, to obtain a modulation scheme and a code rate of the first data stream.

In some of the foregoing implementations, after the obtaining the instantaneous transmission rate supported by the second data stream, the method further includes: querying, by the base station based on the instantaneous transmission rate supported by the second data stream, a table of a correspondence between an instantaneous transmission rate supported by a data stream, a modulation scheme, and a code rate, to obtain a modulation scheme and a code rate of the second data stream.

In some of the foregoing implementations, the modulation scheme includes QPSK, 16QAM, 64QAM, and 256QAM.

In some of the foregoing implementations, the sending period of sending the first index is 1 ms to 10 s, and the sending period of sending the second index is 0.1 ms to 1 s.

In some of the foregoing implementations, a quantity of antennas of the base station and a quantity of antennas of the UE are both greater than or equal to 1.

In some of the foregoing implementations, the quantity of antennas of the base station ranges from 1 to 1024, and the quantity of antennas of the UE ranges from 1 to 8.

BRIEF DESCRIPTION OF DRAWINGS

To describe the technical solutions in embodiments of the present invention more clearly, the following briefly describes the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

Figure 1:
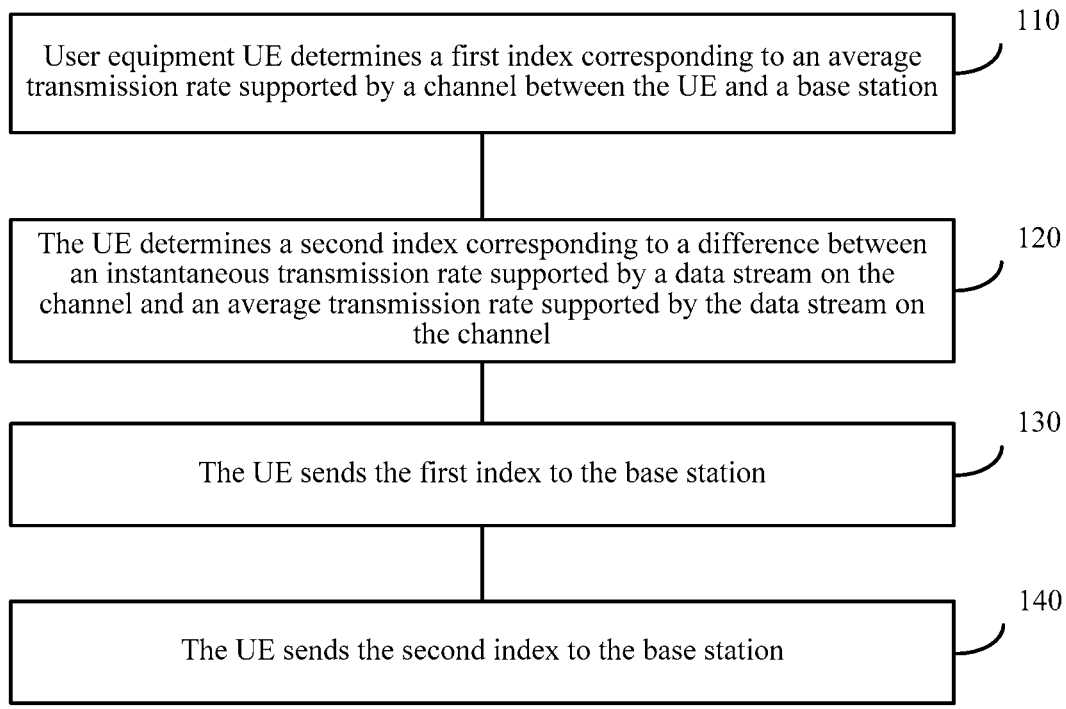
FIG. 1 is a schematic flowchart of a method for determining a transmission rate supported by a data stream according to an embodiment of the present invention.

The following clearly and completely describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

It should be understood that the technical solutions of the present invention may be applied to various communications systems, such as: a Global System for Mobile Communications (Global System of Mobile communication, GSM), a Code Division Multiple Access (Code Division Multiple Access, CDMA) system, a Wideband Code Division Multiple Access (Wideband Code Division Multiple Access Wireless, WCDMA), a general packet radio service (General Packet Radio Service, GPRS), a Long Term Evolution (Long Term Evolution, LTE) system, a Long Term Evolution Advanced (Advanced long term evolution, LTE-A) system, a Universal Mobile Telecommunications System (Universal Mobile Telecommunication System, UMTS), and a 5G system.

It should further be understood that in the embodiments of the present invention, user equipment (User Equipment, UE) includes but is not limited to a mobile station (Mobile Station, Miss.), a mobile terminal (Mobile Terminal), a mobile telephone (Mobile Telephone), a handset (handset), portable equipment (portable equipment), and the like. The user equipment may communicate with one or more core networks by using a radio access network (Radio Access Network, RAN). For example, the user equipment may be a mobile telephone (or referred to as a "cellular" telephone), or a computer having a wireless communication function; or the user equipment may be a portable, pocket-sized, handheld, computer built-in, or in-vehicle mobile apparatus.

In Table 1, a CQI index ranges from 0 to 15, and there are 16 levels in total; a rate ranges from 0 to 5.5547; and an average level gap is 5.5547/15=0.37, but an actual gap between adjacent levels may be greater than 0.37. For example, a gap between a level 0 and a level 1 is 0.1523, a gap between a level 12 and a level 13 is 0.62, and a gap between adjacent levels has a relatively large fluctuation range. In the prior art, UE needs to determine quality of a channel first, and obtain through conversion an instantaneous transmission rate supported by the channel, and then, select, by querying Table 1, a rate relatively close to the instantaneous transmission rate supported by the channel. However, because a gap between levels in Table 1 has a very large fluctuation range, sometimes, it is very difficult to select, from Table 1, a rate relatively close to the instantaneous transmission rate supported by the channel. For example, if the instantaneous transmission rate supported by the channel is 0.58, in Table 1, two rates closest to the rate of 0.58 are respectively a rate of 0.38 corresponding to a CQI=3 and a rate of 0.60 corresponding to a CQI=4. Although the rate corresponding to the CQI=4 is closer to the instantaneous transmission rate supported by the channel, the UE can feed back only a value of a CQI index corresponding to a rate lower than the instantaneous transmission rate supported by the channel. To be specific, the UE can feed back only the CQI=3 to a base station. In this way, the base station can transmit data to the UE on the channel only at the maximum of the rate of 0.38. Consequently, a waste of a rate of 0.2 is caused. To be specific, when transmitting data to the UE, the base station uses only 0.38/0.58=66% of a communication capability of the channel, leading to low channel utilization and underutilization of channel resources.

In the prior art, usually, the UE periodically measures the quality of the channel, to obtain the instantaneous transmission rate supported by the channel, and then queries Table 1 to determine a corresponding CQI index, and feeds back the CQI index to the base station. Generally, the quality of the channel is affected by two types of factors. The two types of factors are referred to as a large-scale feature and a small-scale feature of the channel herein. The large-scale feature is a main factor that determines the quality of the channel, is mainly reflected in an average received signal-to-noise ratio of the channel, and is mainly determined by factors such as whether a transmit antenna has a direct component, a distance between the transmit antenna and a receive antenna, and a quantity of buildings that a signal transmitted by the transmit antenna needs to pass through before the signal reaches the receive antenna. These factors have relatively large impact on the quality of the channel, but the large-scale feature has a very slow change. In most application scenarios, if measurement is performed within a time length of 320 ms to 100 s, the large-scale feature of the channel has a very small change. Compared with the large-scale feature, the small-scale feature is a rather minor factor that determines the quality of the channel, and mainly includes factors such as fading and a shadow effect. These factors have a relatively fast change. Therefore, the small-scale feature causes the quality of the channel to always fluctuate within a relatively small range. A fluctuation speed is related to a Doppler frequency, and a change frequency of the small-scale feature is generally 1 to 10 milliseconds. In embodiments of the present invention, based on the foregoing features of the channel, when a CQI index is fed back, the large-scale feature and the small-scale feature of the channel are considered, and two CQI indexes are fed back to the base station respectively based on the large-scale feature and the small-scale feature of the channel. The small-scale feature causes a relatively small fluctuation range of quality of a signal. In this way, when the second CQI index is fed back to the base station based on the small-scale feature, the gap between the levels may be made to be very small (to be specific, a granularity is very small). In this way, the UE can more accurately feed back the instantaneous transmission rate supported by the channel to the base station by feeding back the two CQI indexes, thereby improving channel resource utilization efficiency. A method and an apparatus for transmitting a CQI in the present invention are described in detail below with reference to specific embodiments.

FIG. 1 is a schematic flowchart of a method for determining a transmission rate supported by a data stream according to an embodiment of the present invention. Steps of the method shown in FIG. 1 are described in detail below.

110: UE determines a first index corresponding to an average transmission rate supported by a channel between the UE and a base station.

Optionally, the UE may determine, based on a first relationship table, that a CQI index corresponding to the average transmission rate supported by the channel is the first index, where the first relationship table is used to indicate a correspondence between the average transmission rate supported by the channel and a CQI index.

120: The UE determines a second index corresponding to a difference between an instantaneous transmission rate supported by a data stream on the channel and an average transmission rate supported by the data stream on the channel.

Optionally, the UE may determine, based on a second relationship table, that a CQI index corresponding to the difference between the instantaneous transmission rate supported by the data stream on the channel and the average transmission rate supported by the data stream on the channel is the second index, where the second relationship table is used to indicate a correspondence between the difference between the instantaneous transmission rate supported by the data stream on the channel and the average transmission rate supported by the data stream on the channel and a CQI index.

Specifically, the UE may separately measure a large-scale feature first, to obtain average quality of the channel, and then obtain, through conversion according to a formula, the average transmission rate supported by the channel. The large-scale feature may be an average signal-to-noise ratio of the channel. In most application scenarios, the average signal-to-noise ratio of the channel has a very small change within a period of time (for example, 1 ms to 10 s). The UE may convert, according to a particular formula, the average signal-to-noise ratio into the average transmission rate supported by the channel, and then determine, by querying a table (in this case, the used table may be Table 7.2.3.1 or Table 7.2.3.2 in 3GPP R12 TS36.213 V12.7.0 or a newly generated table), that the CQI index corresponding to the average transmission rate supported by the channel is the first index. When determining the second index, the UE may determine, based on the average transmission rate supported by the channel, the average transmission rate supported by the data stream on the channel. When there is only one data stream on the channel, the average transmission rate supported by the data stream on the channel is the average transmission rate supported by the channel. When the channel includes a plurality of data streams, the average transmission rate supported by the channel may be a sum of average values of transmission rates supported by all the data streams on the channel. In this case, an average transmission rate supported by each data stream on the channel may be determined based on a relationship between the average transmission rate supported by the channel and each data stream. In addition, when the average transmission rate supported by the channel is defined, an average transmission rate supported by any data stream on the channel may be defined as the average transmission rate supported by the channel. For example, when the channel includes two data streams, an average transmission rate supported by a first data stream may be defined as the average transmission rate supported by the channel. In this way, after obtaining the average transmission rate supported by the channel, the base station may directly determine an average transmission rate supported by the first stream, and then, determine, based on a relationship between the average transmission rate supported by the first data stream and an average transmission rate supported by a second data stream, the average transmission rate supported by the second data stream. Alternatively, other indicators indicating the average transmission rate supported by the channel may be defined as the average transmission rate supported by the channel, and the base station may determine, according to these indicators indicating the average transmission rate supported by the channel, an average transmission rate supported by each data stream.

In addition, the UE may comprehensively measure the large-scale feature and a small-scale feature, to obtain the instantaneous transmission rate supported by the data stream on the channel and obtain the difference between the instantaneous transmission rate supported by the data stream on the channel and the average transmission rate supported by the data stream on the channel, and then, determine, by querying a table (in this case, the used table may be a newly defined table, and the table is a table of a correspondence between a rate difference and a CQI index) based on the difference, that the CQI index corresponding to the difference is the second index.

130: The UE sends the first index to the base station.

It should be understood that, the first index reflects the large-scale feature of the channel. The large-scale feature has a relatively slow change. Therefore, one first index may be fed back to the base station within a period of T, where a time range of T may be 1 ms to 100 seconds. In addition, when the first index is fed back, a periodic sending manner may not be used, and instead, the first index is fed back to the base station through triggering. For example, when the average quality of the channel changes or a change in the average quality exceeds a preset threshold, the UE re-sends the first index to the base station. To be specific, after the average rate supported by the channel between the UE and the base station changes, or a change exceeds a specified threshold, the UE re-sends the first index to the base station; otherwise, the UE does not re-send the first index to the base station. It should be further understood that, the first index sent by the UE reflects an average transmission rate currently supported by the channel.

140: The UE sends the second index to the base station.

After receiving the first index and the second index corresponding to the data stream on the channel, the base station may determine, based on the first index and the second index corresponding to the data stream on the channel, the instantaneous transmission rate supported by the data stream on the channel.

The channel may include one data stream or may include a plurality of data streams.

Specifically, when a rank of a matrix of the channel is 1, the channel includes only one first data stream. In this case, there is one second index, and the second index indicates a CQI index corresponding to a difference between an instantaneous transmission rate supported by the first data stream on the channel and an average transmission rate supported by the first data stream. When the rank of the matrix of the channel is greater than 1, the channel includes a plurality of data streams. In this case, each data stream corresponds to one second index, and the UE needs to send the second index corresponding to each of the plurality of data streams to the base station. To be specific, the UE needs to send a plurality of second indexes to the base station.

A quantity of bits occupied by the second index may be less than or equal to a quantity of bits occupied by the first index. Specifically, the quantity of bits occupied by the second index may be less than 4, and the quantity of bits occupied by the first index is greater than or equal to 4. For example, the quantity of bits occupied by the second index may be 3, and the quantity of bits occupied by the first index may be 4.

In this embodiment of the present invention, the UE sends the first index and the second index, to separately feed back the average transmission rate supported by the channel, and the difference between the instantaneous transmission rate supported by the data stream on the channel and the average transmission rate supported by the data stream on the channel to the base station, so that the instantaneous transmission rate supported by the data stream on the channel can be relatively accurately fed back to the base station, thereby improving channel resource utilization.

Optionally, in an embodiment, when the channel between the UE and the base station includes a plurality of data streams, the plurality of data streams are in a one-to-one correspondence with a plurality of second indexes. Specifically, when the plurality of data streams include a first data stream and a second data stream, specific processes of feeding back a CQI to the base station by the UE and determining, by the base station, an instantaneous transmission rate supported by the first data stream and an instantaneous transmission rate supported by the second data stream are as follows:

210: The UE sends a second index corresponding to the first data stream to the base station, where the second index corresponding to the first data stream is used to indicate a CQI index corresponding to a difference between an instantaneous transmission rate supported by the first data stream and an average transmission rate supported by the first data stream.

220: The UE sends a second index corresponding to the second data stream to the base station, where the second index corresponding to the second data stream is used to indicate a CQI index corresponding to a difference between an instantaneous transmission rate supported by the second data stream and an average transmission rate supported by the second data stream.

230: The base station determines, based on the first index, the average transmission rate supported by the channel.

240: The base station determines, based on the average transmission rate supported by the channel, the average transmission rate supported by the first data stream and the average transmission rate supported by the second data stream.

250: The base station determines, based on the second index corresponding to the first data stream, that the difference between the instantaneous transmission rate supported by the first data stream and the average transmission rate supported by the first data stream is a first difference.

260: The base station determines, based on the second index corresponding to the second data stream, that the difference between the instantaneous transmission rate supported by the second data stream and the average transmission rate supported by the second data stream is a second difference.

270: The base station determines, based on the average transmission rate supported by the first data stream and the first difference, the instantaneous transmission rate supported by the first data stream.

280: The base station determines, based on the average transmission rate supported by the second data stream and the second difference, the instantaneous transmission rate supported by the second data stream.

It may be learned through the foregoing steps that, when the channel includes a plurality of data streams, the first index indicates an average transmission rate supported by the plurality of data streams on the channel. In this case, an average transmission rate supported by each data stream needs to be calculated first based on the first index, and then an instantaneous transmission rate supported by each data stream is calculated based on a second index corresponding to each data stream.

Figure 2:
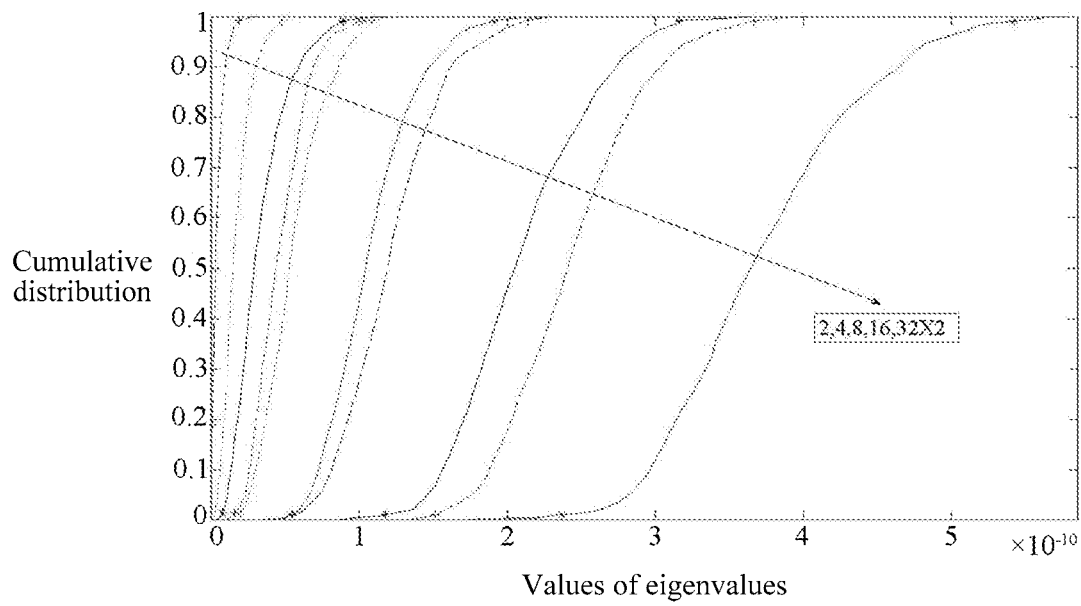
FIG. 2 is a diagram of cumulative distribution of values of eigenvalues in different antenna configurations.

Specifically, this embodiment of the present invention may be detailed to a specific antenna configuration. For the channel, an eigenvalue of the channel may be used to reflect a transmission rate supported by the channel. Therefore, when an RI=1, a system uses a maximum eigenvalue, or when an RI>1, a system uses more than one eigenvalue to transmit information about more than one stream. Descriptions are provided below with reference to FIG. 2. FIG. 2 is generated based on 3GPP R12. In FIG. 2, there are five pairs of curves in total that are sequentially curves of eigenvalues corresponding to 2×2, 4×2, 8×2, 16×2, and 32×2 antenna configurations from left to right. There are two receive antennas. Therefore, a conjugate transpose of the matrix of the channel is multiplied by the matrix of the channel, to obtain two eigenvalues. Herein, a solid line is used to indicate a larger eigenvalue in each antenna configuration, and a dotted line is used to indicate a smaller eigenvalue. The matrix of the channel is randomly generated. Therefore, eigenvalues of the channel are random numbers. These random numbers fluctuate within a particular range. FIG. 2 shows cumulative distribution values of these eigenvalues. An average value of these eigenvalues is determined by the large-scale feature of the channel, and a fluctuation of these eigenvalues is determined by the small-scale feature of the channel. It can be learned from FIG. 2 that, for a channel with 32 transmit antennas and two receive antennas, smallest 1% of maximum eigenvalues are exactly 1.1892, largest 1% of the maximum eigenvalues are exactly 3.3031 (indicated by * in the figure), and 3.3031 is 2.78 times 1.1892. In this way, in 98% of all cases, a fluctuation range of the maximum eigenvalue is 2.78 times, and the logarithm of 2.78 to the base 2 is 1.47. When 4 bits are used for quantization, a relatively small granularity can be obtained. Assuming that an average received signal-to-noise ratio of the system is 10 dB, and noise is 5e-13/Hz, large eigenvalues and small eigenvalues in various antenna configurations in FIG. 2 are calculated, to obtain transmission rates corresponding to these eigenvalues. As shown in Table 2, it should be understood that, when Table 2 is calculated, only an SNR is considered without considering an SINR. If the SINR is considered, emulation results are also relatively close to Table 2. Herein, only Table 2 is used as an example for description. This embodiment of the present invention is also applicable to a case in which interference exists.

Herein, for largest 1% and smallest 1% of large eigenvalues and small eigenvalues, corresponding transmission rates are calculated according to the Shannon's equation. In this way, fluctuation ranges of a transmission rate corresponding to the large eigenvalue and a transmission rate corresponding to the small eigenvalue are obtained. This is equivalent to removing average values from eigenvalues. It can be learned from Table 2 that, for a plurality of antennas such as 32×2 antennas, a fluctuation range of a large eigenvalue is very small, and a fluctuation range of a small eigenvalue is also very small. For 2×2 antennas and 4×2 antennas, a fluctuation range of a small eigenvalue is relatively large. For example, for the 4×2 antennas, the fluctuation range of the small eigenvalue is 4.038. However, when the eigenvalue is mapped to a rate by using the Shannon's equation, an actually considered range is not very large. Therefore, the transmission rate supported by the channel, and the difference between the instantaneous transmission rate supported by the data stream on the channel and the average transmission rate supported by the data stream on the channel are separately fed back to the base station, so that when the difference between the instantaneous transmission rate supported by the data stream and the average transmission rate supported by the data stream is fed back, a smaller granularity can be used, and the instantaneous transmission rate supported by the channel can be more accurately fed back.

Optionally, in an embodiment, the channel includes N data streams, where an eigenvalue corresponding to an $(N-1)^{th}$ data stream is greater than an eigenvalue corresponding to an $N^{th}$ data stream, where N is an integer greater than 1, and the UE may determine, based on a second index corresponding to at least one of a first data stream to the $(N-1)^{th}$ data stream, a fluctuation range of a difference between an instantaneous transmission rate supported by the $N^{th}$ data stream and an average transmission rate supported by the $N^{th}$ data stream; and next, the UE determines, within the fluctuation range of the difference, that a CQI index corresponding to the $N^{th}$ data stream is a second index corresponding to the $N^{th}$ data stream.

Specifically, it is assumed that the channel between the UE and the base station includes a first data stream, a second data stream, and a third data stream, an eigenvalue corresponding to the first data stream is greater than an eigenvalue of the second data stream, the eigenvalue of the second data stream is greater than an eigenvalue corresponding to the third data stream, the first index occupies 4 bits, and the second index occupies 3 bits. Therefore, a process of determining, by the UE, a second index corresponding to each data stream is as follows:

TABLE 2

Transmission rates corresponding to eigenvalues in different antenna configurations

| Antenna configuration | Smallest 1% of maximum eigenvalues, unit: e−010 | Largest 1% of the maximum eigenvalues, unit: e−010 | Log2(1 + the second column/noise) − log2(1 + the first column/noise) | Smallest 1% of minimum eigenvalues, unit: e−010 | Largest 1% of the minimum eigenvalues, unit: e−010 | Log2(1 + the fifth column/noise) − log2(1 + the sixth column/noise) |
|---|---|---|---|---|---|---|
| 2 × 2 | 0.436 | 0.0215 | 4.058 | 0.0649 | 0.000015 | 3.8 |
| 4 × 2 | 0.568 | 0.0723 | 2.89 | 0.1638 | 0.00528 | 4.038 |
| 8 × 2 | 0.940 | 0.1874 | 2.29 | 0.3361 | 0.05928 | 2.408 |
| 16 × 2 | 0.564 | 1.905 | 1.75 | 0.854 | 0.2259 | 1.895 |
| 32 × 2 | 1.1892 | 3.3031 | 1.47 | 1.9458 | 0.6934 | 1.477 |

(1) A second index corresponding to the first data stream is determined based on the first index.

A value of the first index ranges from 1 to 15 (during actual application, a case in which the value is 0 is not considered), and each index value corresponds to one table (there are 15 corresponding tables in total). After determining the first index, the UE finds, from the 15 tables, a table corresponding to the first index, and then, determines, based on the table, the second index corresponding to the first data stream.

(2) A second index corresponding to the second data stream is determined based on the first index and the second index corresponding to the first data stream.

The value of the first index ranges from 1 to 15 (there are 15 corresponding tables), and a value of the second index corresponding to the first data stream ranges from 0 to 7 (there are eight corresponding tables). After determining the first index and the second index corresponding to the first data stream, the UE finds, from the 15×8 tables, a table corresponding to the value of the first index and the value of the second index corresponding to the first data stream, and then, determines, based on the table, the second index corresponding to the second data stream.

(3) A second index corresponding to the third data stream is determined based on the first index, the second index corresponding to the first data stream, and the second index corresponding to the second data stream.

The value of the first index ranges from 1 to 15 (there are 15 corresponding tables), the value of the second index corresponding to the first data stream ranges from 0 to 7 (there are eight corresponding tables), and a value of the second index corresponding to the second data stream ranges from 0 to 7 (there are eight corresponding tables). After determining the first index, the second index corresponding to the first data stream, and the second index corresponding to the second data stream, the UE finds a corresponding table from the 15×8×8 tables, and then, determines, based on the table, the second index corresponding to the third data stream.

It should be understood that, after receiving the first index, and the second indexes corresponding to the first data stream, the second data stream, and the third data stream that are sent by the UE, the base station can determine, based on indication information of the UE or in another manner, a corresponding table used by the UE to generate the second index corresponding to each data stream. In this way, the base station can query the corresponding table, to obtain an instantaneous transmission rate supported by each data stream. These tables may be prestored in the UE and the base station, and actually occupy space of not more than 100 K.

The method for determining a transmission rate of a data stream in this embodiment of the present invention is described in detail below with reference to a specific embodiment.

When the RI=1, the channel includes only one first data stream, and specific steps of feeding back a CQI index to the base station by the UE and determining, by the base station based on the CQI index fed back by the UE, an instantaneous transmission rate supported by the first data stream, a corresponding modulation scheme, and a corresponding code rate are as follows:

301: The UE obtains, based on an average received signal-to-noise ratio of the channel, an average rate bits per second ($\overline{BPS}$) supported by the first data stream, and the UE determines, based on a table of a correspondence between the average rate of the channel and a CQI index, a first index corresponding to $\overline{BPS}$, and feeds back the first index to the base station.

302: The UE obtains, based on instantaneous quality of the first data stream on the channel, the instantaneous transmission rate supported by the first data stream, determines that a difference between the instantaneous transmission rate supported by the first data stream and the average transmission rate supported by the first data stream is $\Delta BPS$, queries a table of a correspondence between the difference between the instantaneous transmission rate and the average rate of the first data stream and a CQI index, selects a second index of the first stream corresponding to $\Delta BPS$, and feeds back the second index corresponding to the first data stream to the base station.

303: The base station receives the first index and the second index of the first data stream.

304: The base station determines, based on the table of the correspondence between the average transmission rate of the channel and the CQI index, the average rate BPS corresponding to the first index.

305: The base station determines, based on the table of the correspondence between the difference between the instantaneous transmission rate and the average rate of the first data stream and the CQI index, the rate difference $\Delta BPS$ corresponding to the second index corresponding to the first stream, and determines that the instantaneous transmission rate supported by the first data stream is $\overline{BPS}+\Delta BPS$

306: Determine, based on a table of a correspondence between a transmission rate, a modulation scheme, and a code rate, a modulation scheme and a code rate that correspond to the rate $\overline{BPS}+\Delta BPS$ When the RI=2, in addition to including a first data stream, the channel includes a second data stream, and specific steps of feeding back a CQI index to the base station by the UE and determining, by the base station based on the CQI index fed back by the UE, an instantaneous transmission rate supported by the first data stream, an instantaneous transmission rate supported by the second data stream, a corresponding modulation scheme, and a corresponding code rate are as follows:

401: The UE obtains, based on an average received signal-to-noise ratio of the channel, an average rate $\overline{BPS}$ supported by the first data stream and an average rate $\overline{BPS}$ supported by the second data stream on the channel, selects, based on a table of a correspondence between the average rate of the channel and a CQI index, a first index corresponding to $\overline{BPS}$, and feeds back the first index to the base station.

402: The UE obtains, based on instantaneous quality of the channel, the instantaneous transmission rate supported by the first data stream and the instantaneous transmission rate supported by the second data stream, and determines a difference $\Delta BPS1$ between the instantaneous transmission rate supported by the first data stream and the average transmission rate supported by the first data stream, and a difference $\Delta BPS2$ between the instantaneous transmission rate supported by the second data stream and the average transmission rate supported by the second data stream.

403: The UE queries a table of a correspondence between the difference between the instantaneous transmission rate and the average rate of the first data stream and a CQI index, to select a second index of the first stream corresponding to $\Delta BPS1$, and feeds back the second index corresponding to the first data stream to the base station.

404: The UE queries a table of a correspondence between the difference between the instantaneous transmission rate and the average rate of the second data stream and a CQI index, to select a second index of the second data stream corresponding to ΔBPS2, and feeds back the second index corresponding to the second data stream to the base station.

405: The base station receives the first index and the second indexes of the first data stream and the second data stream.

406: The base station determines, based on the table of the correspondence between the average rate of the channel and the CQI index, the average rate $\overline{BPS}$ corresponding to the first index.

407: The base station determines, based on $\overline{BPS}$, that the average transmission rate supported by the first data stream is $\overline{BPS1}$ and the average transmission rates supported by the second data stream is $\overline{BPS2}$.

408: The base station determines, based on the table of the correspondence between the difference between the instantaneous transmission rate and the average transmission rate of the first data stream and the CQI index, the rate difference ΔBPS1 corresponding to the second index corresponding to the first stream.

409: The base station determines, based on the table of the correspondence between the difference between the instantaneous transmission rate and the average rate of the second data stream and the CQI index, the rate difference ΔBPS2 corresponding to the second index corresponding to the second data stream.

410: The base station determines that the instantaneous transmission rate supported by the first data stream is $\overline{BPS1}$+ΔBPS1.

411: The base station determines that the instantaneous transmission rate supported by the second data stream is $\overline{BPS2}$+ΔBPS2.

412: The base station determines, based on a table of a correspondence between a transmission rate, a modulation scheme, and a code rate, a modulation scheme and a code rate that correspond to the rate of $\overline{BPS1}$+ΔBPS1.

413: The base station determines, based on the table of the correspondence between the transmission rate, the modulation scheme, and the code rate, a modulation scheme and a code rate that correspond to the rate of $\overline{BPS2}$+ΔBPS2.

To more specifically describe a process of determining, by the base station, the transmission rate supported by the data stream, processes of determining, by the base station, the transmission rate supported by the first data stream and the transmission rate supported by the second data stream are described in detail with reference to Table 3, Table 4, Table 5, and Table 6 by using a case in which the RI=2 as an example below.

TABLE 3

Correspondence between a rate difference of the first data stream and a CQI index

| CQI | 2 × 2 antennas | 4 × 2 antennas | 8 × 2 antennas | 16 × 2 antennas | 32 × 2 antennas |
|---|---|---|---|---|---|
| 0 | −2.4 | −1.6 | −1.28 | −1.04 | −0.8 |
| 1 | −2.1 | −1.4 | −1.12 | −0.91 | −0.7 |
| 2 | −1.8 | −1.2 | −0.96 | −0.78 | −0.6 |
| 3 | −1.5 | −2 | −0.8 | −0.65 | −0.5 |
| 4 | −1.2 | −0.8 | −0.64 | −0.52 | −0.4 |
| 5 | −0.9 | −0.6 | −0.48 | −0.39 | −0.3 |
| 6 | −0.6 | −0.4 | −0.32 | −0.26 | −0.2 |
| 7 | −0.3 | −0.2 | −0.16 | −0.13 | −0.1 |
| 8 | 0 | 0 | 0 | 0 | 0 |
| 9 | 0.3 | 0.2 | 0.16 | 0.13 | 0.1 |
| 10 | 0.6 | 0.4 | 0.32 | 0.26 | 0.2 |
| 11 | 0.9 | 0.6 | 0.48 | 0.39 | 0.3 |
| 12 | 1.2 | 0.8 | 0.64 | 0.52 | 0.4 |
| 13 | 1.5 | 1 | 0.8 | 0.65 | 0.5 |
| 14 | 1.8 | 1.2 | 0.96 | 0.78 | 0.6 |
| 15 | 2.1 | 1.4 | 1.12 | 0.91 | 0.7 |

TABLE 4

Correspondence between a rate difference of the second data stream and a CQI index

| CQI | 2 × 2 antennas | 4 × 2 antennas | 8 × 2 antennas | 16 × 2 antennas | 32 × 2 antennas |
|---|---|---|---|---|---|
| 0 | −2.4 | −2.4 | −1.28 | −1.04 | −0.8 |
| 1 | −2.1 | −2.1 | −1.12 | −0.91 | −0.7 |
| 2 | −1.8 | −1.8 | −0.96 | −0.78 | −0.6 |
| 3 | −1.5 | −1.5 | −0.8 | −0.65 | −0.5 |
| 4 | −1.2 | −1.2 | −0.64 | −0.52 | −0.4 |
| 5 | −0.9 | −0.9 | −0.48 | −0.39 | −0.3 |
| 6 | −0.6 | −0.6 | −0.32 | −0.26 | −0.2 |
| 7 | −0.3 | −0.3 | −0.16 | −0.13 | −0.1 |
| 8 | 0 | 0 | 0 | 0 | 0 |
| 9 | 0.3 | 0.3 | 0.16 | 0.13 | 0.1 |
| 10 | 0.6 | 0.6 | 0.32 | 0.26 | 0.2 |
| 11 | 0.9 | 0.9 | 0.48 | 0.39 | 0.3 |
| 12 | 1.2 | 1.2 | 0.64 | 0.52 | 0.4 |
| 13 | 1.5 | 1.5 | 0.8 | 0.65 | 0.5 |
| 14 | 1.8 | 1.8 | 0.96 | 0.78 | 0.6 |
| 15 | 2.1 | 2.1 | 1.12 | 0.91 | 0.7 |

TABLE 5

Correspondence between a rate, a modulation scheme, and a code rate

| $\overline{BPS}$ + ΔBPS | Modulation scheme | Code rate * 1024 |
|---|---|---|
| 0.05 | QPSK | 25.6 |
| 0.1 | QPSK | 51.2 |
| 0.15 | QPSK | 76.8 |
| 0.2 | QPSK | 102.4 |
| ... | QPSK | ... |
| 1.45 | 16QAM | 371 |
| 1.5 | 16QAM | 384 |
| ... | 16QAM | ... |
| 4.40 | 64QAM | 563 |
| 4.45 | 64QAM | 569 |
| 4.50 | 64QAM | 576 |
| ... | 64QAM | ... |
| 5.30 | 256QAM | 678 |
| 5.35 | 256QAM | 710 |
| 5.40 | 256QAM | 691 |
| 5.6 | 256QAM | 716 |
| ... | 256QAM | ... |

TABLE 6

Correspondence between the second index of the first data stream and a rate difference of the second data stream

| CQI index corresponding to the rate difference of the second data stream | First data stream, a second index is 4 | First data stream, a second index is 5 | ... |
|---|---|---|---|
| 0 | −1.12 | −1.28 | ... |
| 1 | −0.98 | −1.12 | ... |

TABLE 6-continued

Correspondence between the second index of the first data stream and a rate difference of the second data stream

| CQI index corresponding to the rate difference of the second data stream | First data stream, a second index is 4 | First data stream, a second index is 5 | ... |
|---|---|---|---|
| 2 | −0.84 | −0.96 | ... |
| 3 | −0.7 | −0.8 | ... |
| 4 | −0.56 | −0.64 | ... |
| 5 | −0.42 | −0.48 | ... |
| 6 | −0.28 | −0.32 | ... |
| 7 | −0.14 | −0.16 | ... |
| 8 | 0 | 0 | ... |
| 9 | 0.14 | 0.16 | ... |
| 10 | 0.28 | 0.32 | ... |
| 11 | 0.42 | 0.48 | ... |
| 12 | 0.56 | 0.64 | ... |
| 13 | 0.7 | 0.8 | ... |
| 14 | 0.84 | 0.96 | ... |
| 15 | 0.98 | 1.12 | ... |

Table 3 shows correspondences between rate differences of the first data stream (differences between instantaneous transmission rates supported by the first data stream and average transmission rates supported by the first data stream) and CQI indexes in different antenna configurations. Table 4 shows correspondences between rate differences of the second data stream (differences between instantaneous transmission rates supported by the second data stream and average transmission rates supported by the second data stream) and CQI indexes in different antenna configurations. Table 5 shows a correspondence between the instantaneous transmission rate supported by the channel, a modulation scheme, and a code rate. The base station may determine, based on Table 3 and Table 4, the instantaneous transmission rate supported by the first data stream and the instantaneous transmission rate supported by the second data stream, and determine, based on Table 5, modulation schemes and code rates that correspond to the first data stream and the second data stream. It should be understood that, when second indexes corresponding to differences between instantaneous transmission rates and average transmission rates of different data streams are determined, different tables need to be used (the first data stream corresponds to Table 3, and the second data stream corresponds to Table 4); and when modulation schemes and code rates that correspond to different data streams are determined, a same table (for example, Table 5) may be used, because the modulation schemes and code rates of the data streams are only related with instantaneous transmission rates supported by the data streams.

A specific process of determining, by the base station, the instantaneous transmission rate supported by the first data stream, the instantaneous transmission rate supported by the second data stream, the modulation schemes, and the code rates is as follows (herein, an 8×2-antenna configuration is used as an example):

First step: The base station receives the first index fed back by the user equipment, and determines, based on the first index, that the average transmission rate supported by the first data stream is 6 bps, and the average transmission rate supported by the second data stream is 4 bps.

Second step: The base station receives a second index 4 corresponding to the first data stream, determines, by querying Table 3, that a rate corresponding to a CQI=4 is −0.64 bps, and accordingly determines that the instantaneous transmission rate supported by the first data stream is 6−0.64=5.36 bps; and then determines, by querying Table 5, that the modulation scheme corresponding to the first data stream is 256QAM, and obtains through calculation that 1024 times the code rate is 5.36*1024/8=686.

Third step: The base station receives a second index 11 corresponding to the second data stream, determines, by querying Table 4, that a rate corresponding to a CQI=4 is 0.48 bps, and accordingly determines that the instantaneous transmission rate supported by the second data stream is 4+0.48=4.48 bps; and then determines, by querying Table 5, that the modulation scheme corresponding to the second data stream is 64QAM, and obtains through calculation that 1024 times the code rate is 4.48*1024/8=573.

In the foregoing steps, when the UE generates the second indexes that respectively correspond to the first data stream and the second data stream, Table 3 and Table 4 are respectively used. The two tables respectively cover all possible rate ranges of the first data stream and the second data stream.

Optionally, if the first index and the second index corresponding to the first data stream are considered, a rate range corresponding to the second data stream can be narrowed down. When a value of the second index corresponding to the first data stream is determined, the rate range of the second data stream is also determined. Table 6 shows a correspondence between the second index of the first data stream and a rate difference of the second data stream. Therefore, when the second index corresponding to the second data stream is generated, refer to Table 6, to generate the second index corresponding to the second data stream. Specifically, because the second index is 4, when generating the second index corresponding to the second data stream, the UE determines, with reference to the second column in Table 6, that the second index corresponding to the second data stream is 11, and feeds back the second index to the base station. The base station determines that the instantaneous transmission rate supported by the second data stream is 4+0.42=4.42 bps. It should be understood that, herein, only determining of a fluctuation range of the rate difference of the second stream based on the value of the second index of the first stream is provided. In fact, when the channel includes a plurality of data streams, a fluctuation range of a rate difference of a smaller eigenvalue may be determined based on a value of a second index of a data stream having a larger eigenvalue. For example, when the channel includes 10 data streams, eigenvalues corresponding to a first data stream to a tenth data stream successively decrease. Therefore, a fluctuation range of a rate difference of a second index of the tenth data stream may be determined based on second indexes of one or more of the first data stream to the ninth data stream.

Optionally, in an embodiment, a quantity of bits occupied by the second index is less than or equal to a quantity of bits occupied by the first index.

Optionally, in an embodiment, the quantity of bits occupied by the first index is 4 to 6, and the quantity of bits occupied by the second index is less than 4. In this embodiment of the present invention, the quantity of bits occupied by the second index is reduced, so that when a granularity corresponding to a CQI basically remains unchanged, signaling overheads occupied by the CQI are reduced.

Specifically, a quantity of bits used to feed back a CQI index in this embodiment of the present invention is compared with a quantity of bits used to feed back a CQI index in the prior art below with reference to a specific example. It is assumed that a communications system uses 3GPP R12, the UE feeds back one CQI index to the base station at an interval of 10 ms, an 8×2-antenna configuration is used in the system, there are eight antennas on a base station side, and two antennas on a UE side, and an average received signal-to-noise ratio is 10.6 dB, to be specific, an avgSNR=8e6. Herein, the quantity of bits occupied for sending a CQI index in the prior art and the quantity of bits occupied for sending a CQI index in this embodiment of the present invention are measured within a time length of 320 ms. In the prior art, a quantity of bits occupied by a CQI index of a first data stream and a quantity of bits occupied by a CQI index of a second data stream are respectively 4 and 3, one CQI index of the first data stream and one CQI index of the second data stream are fed back to the base station at an interval of 10 ms, and a total of 32 feedbacks are provided within the time of 320 ms. Therefore, in the prior art, within the 320 ms, information of 4×32+3×32=224 bits is cumulatively used for feeding back CQI indexes. However, in this embodiment of the present invention, within the time of 320 ms, only one first index needs to be fed back, and a length of the first index may be 4 bits to 6 bits. Next, 3 bits are used for feeding back an instantaneous change part of each of the first data stream and the second data stream. As shown in Table 2, the first data stream uses 3 bits to indicate a change within a range of 2.29, and the second data stream uses 3 bits to indicate a change within a range of 2.408. In this way, within the period of 320 ms, information of (3+3)×32+6=198 bits is cumulatively used for feeding back the CQI index. For the first data stream, an average granularity is 0.33, and compared with an average granularity of 0.37 in Table 1, the average granularity is lower than an average granularity in the prior art. Therefore, according to the method for determining a transmission rate of a data stream in this embodiment of the present invention, a quantity of bits occupied for transmitting a CQI index can be reduced when it is ensured that a granularity basically remains unchanged, and even, a granularity of a rate corresponding to the CQI can be reduced when the quantity of bits occupied for transmitting the CQI index is reduced.

The method for determining a transmission rate supported by a data stream in this embodiment of the present invention is described in detail above with reference to FIG. 1 and FIG. 2 and Table 2 to Table 6. User equipment and a base station in embodiments of the present invention are described below with reference to FIG. 3 to FIG. 6. It should be understood that, the user equipment and the base station in FIG. 3 to FIG. 6 can implement steps of the method for transmitting a CQI above. For brevity, repeated descriptions are properly omitted.

Figure 3:
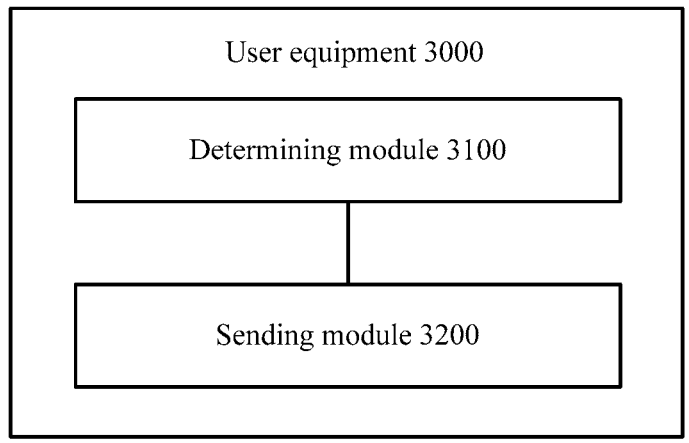
FIG. 3 is a schematic block diagram of user equipment according to an embodiment of the present invention.

FIG. 3 is a schematic block diagram of user equipment according to an embodiment of the present invention. The user equipment 3000 includes:

a determining module 3010, configured to determine a first index corresponding to an average transmission rate supported by a channel between the user equipment and the base station, where the determining module 3010 is further configured to determine a second index corresponding to a difference between an instantaneous transmission rate supported by a data stream on the channel and an average transmission rate supported by the data stream on the channel; and a sending module 3020, configured to send the first index to the base station, where the sending module 3020 is further configured to send the second index to the base station.

In this embodiment of the present invention, the UE sends the first index and the second index, to separately feed back the average transmission rate supported by the channel, and the difference between the instantaneous transmission rate supported by the data stream on the channel and the average transmission rate supported by the data stream on the channel to the base station, so that the instantaneous transmission rate supported by the data stream on the channel can be relatively accurately fed back to the base station, thereby improving channel resource utilization.

Optionally, in an embodiment, the determining module 3010 is specifically configured to: determine, based on a first relationship table, that a CQI index corresponding to the average transmission rate supported by the channel is the first index, where the first relationship table is used to indicate a correspondence between the average transmission rate supported by the channel and a CQI index.

Optionally, in an embodiment, the determining module 3010 is specifically configured to: determine, based on a second relationship table, that a CQI index corresponding to the difference between the instantaneous transmission rate supported by the data stream on the channel and the average transmission rate supported by the data stream on the channel is the second index, where the second relationship table is used to indicate a correspondence between the difference between the instantaneous transmission rate supported by the data stream on the channel and the average transmission rate supported by the data stream on the channel and a CQI index.

Optionally, in an embodiment, the channel includes a plurality of data streams, the plurality of data streams are in a one-to-one correspondence with a plurality of second indexes, and the sending module 3020 is specifically configured to send a second index corresponding to each of the plurality of data streams on the channel to the base station.

Optionally, in an embodiment, the plurality of data streams include a first data stream and a second data stream, and the sending module 3020 is specifically configured to: send a second index corresponding to the first data stream to the base station, where the second index corresponding to the first data stream is used to indicate a CQI index corresponding to a difference between an instantaneous transmission rate supported by the first data stream and an average transmission rate supported by the first data stream; and send a second index corresponding to the second data stream to the base station, where the second index corresponding to the second data stream is used to indicate a CQI index corresponding to a difference between an instantaneous transmission rate supported by the second data stream and an average transmission rate supported by the second data stream.

Optionally, in an embodiment, the channel includes N data streams, where an eigenvalue corresponding to an $(N-1)^{th}$ data stream is greater than an eigenvalue corresponding to an $N^{th}$ data stream, where N is an integer greater than 1, and the determining module 3010 is specifically configured to: determine, based on a second index corresponding to at least one of a first data stream to the $(N-1)^{th}$ data stream, a fluctuation range of a difference between an instantaneous transmission rate supported by the $N^{th}$ data stream and an average transmission rate supported by the $N^{th}$ data stream; and determine, within the fluctuation range of the difference, that a CQI index corresponding to the $N^{th}$ data stream is a second index corresponding to the $N^{th}$ data stream.

Optionally, in an embodiment, a quantity of bits occupied by the second index is less than or equal to a quantity of bits occupied by the first index.

Optionally, in an embodiment, the quantity of bits occupied by the second index is less than 4, and the quantity of bits occupied by the first index is greater than or equal to 4.

Optionally, in an embodiment, a period of sending the first index by the sending module 3020 is greater than a period of sending the second index by the sending module 3020.

Optionally, in an embodiment, when a change in the average rate supported by the channel exceeds a preset threshold, the sending module 3020 re-sends the first index to the base station.

Figure 4:
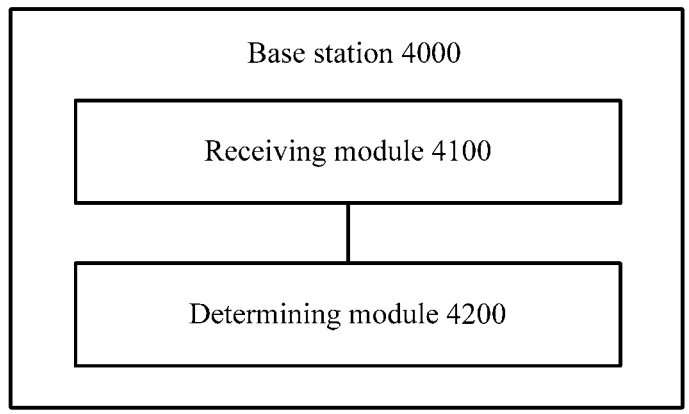
FIG. 4 is a schematic block diagram of a base station according to an embodiment of the present invention.

FIG. 4 is a schematic block diagram of a base station according to an embodiment of the present invention. The base station 4000 includes:

a receiving module 4010, configured to receive a second index sent by the UE, where the second index is used to indicate a difference between an instantaneous transmission rate supported by a data stream on the channel and an average transmission rate supported by the data stream on the channel, where the receiving module 4010 is further configured to receive a second index sent by the UE, where the second index is used to indicate a difference between an instantaneous transmission rate supported by a data stream on the channel and an average transmission rate supported by the data stream on the channel; and a determining module 4020, configured to determine, based on the first index and the second index, the instantaneous transmission rate supported by the data stream on the channel.

In this embodiment of the present invention, the UE sends the first index and the second index, to separately feed back the average transmission rate supported by the channel, and the difference between the instantaneous transmission rate supported by the data stream on the channel and the average transmission rate supported by the data stream on the channel to the base station, so that the instantaneous transmission rate supported by the data stream on the channel can be relatively accurately fed back to the base station, thereby improving channel resource utilization.

Optionally, in an embodiment, the first index is a CQI index corresponding to the average transmission rate supported by the channel, and the second index is a CQI index corresponding to the difference between the instantaneous transmission rate supported by the data stream on the channel and the average transmission rate supported by the data stream on the channel.

Optionally, in an embodiment, the channel includes a plurality of data streams, the plurality of data streams are in a one-to-one correspondence with a plurality of second indexes, and the receiving module 4010 is specifically configured to receive a second index corresponding to each of the plurality of data streams on the channel and sent by the UE.

Optionally, in an embodiment, the plurality of data streams include a first data stream and a second data stream, and the receiving module 4010 is specifically configured to: receive a second index corresponding to the first data stream and sent by the UE, where the second index corresponding to the first data stream is used to indicate a CQI index corresponding to a difference between an instantaneous transmission rate supported by the first data stream and an average transmission rate supported by the first data stream; and receive a second index corresponding to the second data stream and sent by the UE, where the second index corresponding to the second data stream is used to indicate a CQI index corresponding to a difference between an instantaneous transmission rate supported by the second data stream and an average transmission rate supported by the second data stream.

Optionally, in an embodiment, the determining module 4020 is specifically configured to:

determine, based on the first index, the average transmission rate supported by the channel;

determine, based on the average transmission rate supported by the channel, the average transmission rate supported by the first data stream and the average transmission rate supported by the second data stream;

determine, based on the second index corresponding to the first data stream, that the difference between the instantaneous transmission rate supported by the first data stream and the average transmission rate supported by the first data stream is a first difference;

determine, based on the second index corresponding to the second data stream, that the difference between the instantaneous transmission rate supported by the second data stream and the average transmission rate supported by the second data stream is a second difference;

determine, based on the average transmission rate supported by the first data stream and the first difference, the instantaneous transmission rate supported by the first data stream; and determine, based on the average transmission rate supported by the second data stream and the second difference, the instantaneous transmission rate supported by the second data stream.

Optionally, in an embodiment, a quantity of bits occupied by the second index is less than or equal to a quantity of bits occupied by the first index.

Optionally, in an embodiment, the quantity of bits occupied by the second index is less than 4, and the quantity of bits occupied by the first index is greater than or equal to 4.

Figure 5:
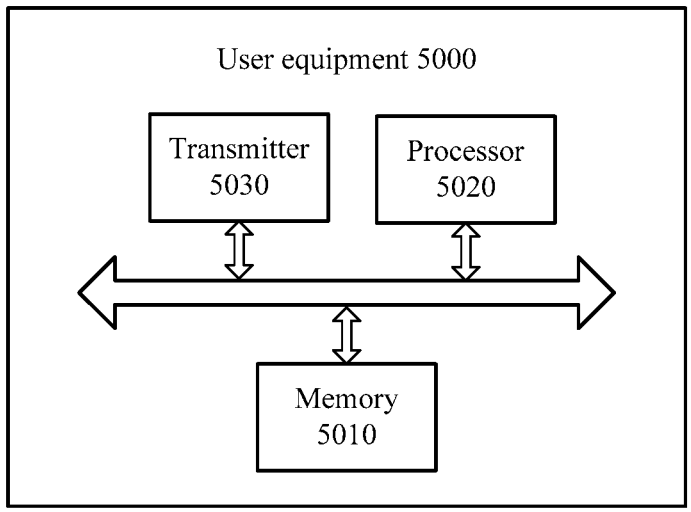
FIG. 5 is a schematic block diagram of user equipment according to an embodiment of the present invention.

FIG. 5 is a schematic block diagram of user equipment according to an embodiment of the present invention. The user equipment 5000 includes:

a memory 5010, configured to store a program;

a processor 5020, where when the program is executed, the processor 5020 is configured to: determine a first index corresponding to an average transmission rate supported by a channel between the user equipment and the base station; and determine a second index corresponding to a difference between an instantaneous transmission rate supported by a data stream on the channel and an average transmission rate supported by the data stream on the channel; and a transmitter 5030, configured to: send the first index to the base station; and send the second index to the base station.

In this embodiment of the present invention, the UE sends the first index and the second index, to separately feed back the average transmission rate supported by the channel, and the difference between the instantaneous transmission rate supported by the data stream on the channel and the average transmission rate supported by the data stream on the channel to the base station, so that the instantaneous transmission rate supported by the data stream on the channel can be relatively accurately fed back to the base station, thereby improving channel resource utilization.

Optionally, in an embodiment, the processor 5020 is specifically configured to: determine, based on a first relationship table, that a CQI index corresponding to the average transmission rate supported by the channel is the first index, where the first relationship table is used to indicate a correspondence between the average transmission rate supported by the channel and a CQI index.

Optionally, in an embodiment, the processor 5020 is specifically configured to: determine, based on a second relationship table, that a CQI index corresponding to the difference between the instantaneous transmission rate supported by the data stream on the channel and the average transmission rate supported by the data stream on the channel is the second index, where the second relationship table is used to indicate a correspondence between the difference between the instantaneous transmission rate supported by the data stream on the channel and the average transmission rate supported by the data stream on the channel and a CQI index.

Optionally, in an embodiment, the channel includes a plurality of data streams, the plurality of data streams are in a one-to-one correspondence with a plurality of second indexes, and the transmitter 5030 is specifically configured to send a second index corresponding to each of the plurality of data streams on the channel to the base station.

Optionally, in an embodiment, the plurality of data streams include a first data stream and a second data stream, and the transmitter 5030 is specifically configured to: send a second index corresponding to the first data stream to the base station, where the second index corresponding to the first data stream is used to indicate a CQI index corresponding to a difference between an instantaneous transmission rate supported by the first data stream and an average transmission rate supported by the first data stream; and send a second index corresponding to the second data stream to the base station, where the second index corresponding to the second data stream is used to indicate a CQI index corresponding to a difference between an instantaneous transmission rate supported by the second data stream and an average transmission rate supported by the second data stream.

Optionally, in an embodiment, the channel includes N data streams, where an eigenvalue corresponding to an $(N-1)^{th}$ data stream is greater than an eigenvalue corresponding to an $N^{th}$ data stream, where N is an integer greater than 1, and the processor 5020 is specifically configured to: determine, based on a second index corresponding to at least one of a first data stream to the $(N-1)^{th}$ data stream, a fluctuation range of a difference between an instantaneous transmission rate supported by the $N^{th}$ data stream and an average transmission rate supported by the $N^{th}$ data stream; and determine, within the fluctuation range of the difference, that a CQI index corresponding to the $N^{th}$ data stream is a second index corresponding to the $N^{th}$ data stream.

Optionally, in an embodiment, a quantity of bits occupied by the second index is less than or equal to a quantity of bits occupied by the first index.

Optionally, in an embodiment, the quantity of bits occupied by the second index is less than 4, and the quantity of bits occupied by the first index is greater than or equal to 4.

Optionally, in an embodiment, a period of sending the first index by the transmitter 5030 is greater than a period of sending the second index by the transmitter 5030.

Optionally, in an embodiment, when a change in the average rate supported by the channel exceeds a preset threshold, the transmitter 5030 re-sends the first index to the base station.

Figure 6:
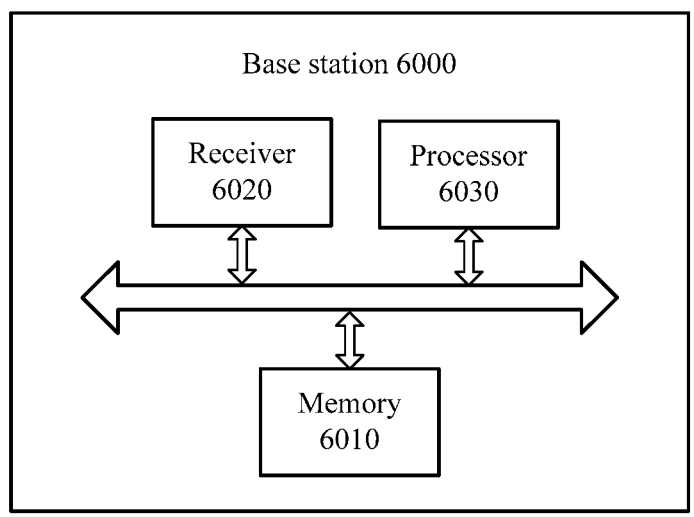
FIG. 6 is a schematic block diagram of a base station according to an embodiment of the present invention.

FIG. 6 is a schematic block diagram of a base station according to an embodiment of the present invention. The base station 6000 includes:

a memory 6010, configured to store a program;

a receiver 6020, configured to receive a second index sent by the UE, where the second index is used to indicate a difference between an instantaneous transmission rate supported by a data stream on the channel and an average transmission rate supported by the data stream on the channel, where the receiver 6020 is further configured to receive a second index sent by the UE, where the second index is used to indicate a difference between an instantaneous transmission rate supported by a data stream on the channel and an average transmission rate supported by the data stream on the channel; and a processor 6030, where when the program is executed, the processor 6030 is configured to determine, based on the first index and the second index, the instantaneous transmission rate supported by the data stream on the channel.

In this embodiment of the present invention, the UE sends the first index and the second index, to separately feed back the average transmission rate supported by the channel, and the difference between the instantaneous transmission rate supported by the data stream on the channel and the average transmission rate supported by the data stream on the channel to the base station, so that the instantaneous transmission rate supported by the data stream on the channel can be relatively accurately fed back to the base station, thereby improving channel resource utilization.

Optionally, in an embodiment, the first index is a CQI index corresponding to the average transmission rate supported by the channel, and the second index is a CQI index corresponding to the difference between the instantaneous transmission rate supported by the data stream on the channel and the average transmission rate supported by the data stream on the channel.

Optionally, in an embodiment, the channel includes a plurality of data streams, the plurality of data streams are in a one-to-one correspondence with a plurality of second indexes, and the receiver 6020 is specifically configured to receive a second index corresponding to each of the plurality of data streams on the channel and sent by the UE.

Optionally, in an embodiment, the plurality of data streams include a first data stream and a second data stream, and the receiver 6020 is specifically configured to: receive a second index corresponding to the first data stream and sent by the UE, where the second index corresponding to the first data stream is used to indicate a CQI index corresponding to a difference between an instantaneous transmission rate supported by the first data stream and an average transmission rate supported by the first data stream; and receive a second index corresponding to the second data stream and sent by the UE, where the second index corresponding to the second data stream is used to indicate a CQI index corresponding to a difference between an instantaneous transmission rate supported by the second data stream and an average transmission rate supported by the second data stream.

Optionally, in an embodiment, the processor 6030 is specifically configured to:

determine, based on the first index, the average transmission rate supported by the channel;

determine, based on the average transmission rate supported by the channel, the average transmission rate supported by the first data stream and the average transmission rate supported by the second data stream;

determine, based on the second index corresponding to the first data stream, that the difference between the instantaneous transmission rate supported by the first data stream and the average transmission rate supported by the first data stream is a first difference;

determine, based on the second index corresponding to the second data stream, that the difference between the instantaneous transmission rate supported by the second data stream and the average transmission rate supported by the second data stream is a second difference;
determine, based on the average transmission rate supported by the first data stream and the first difference, the instantaneous transmission rate supported by the first data stream; and
determine, based on the average transmission rate supported by the second data stream and the second difference, the instantaneous transmission rate supported by the second data stream.

Optionally, in an embodiment, a quantity of bits occupied by the second index is less than or equal to a quantity of bits occupied by the first index.

Optionally, in an embodiment, the quantity of bits occupied by the second index is less than 4, and the quantity of bits occupied by the first index is greater than or equal to 4.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for determining a transmission rate supported by a data stream, comprising:
determining, by a user equipment (UE), a first index corresponding to an average transmission rate supported by a channel between the UE and a base station, wherein the average transmission rate supported by the channel is an average transmission rate of one or more data streams on the channel;
determining, by the UE, a second index corresponding to a difference between an instantaneous transmission rate supported by a data stream on the channel and an average transmission rate supported by the data stream on the channel;
sending, by the UE, the first index to the base station;
in response to determining that a change in the average transmission rate supported by the channel exceeds a preset threshold, re-sending, by the UE, the first index to the base station; and
sending, by the UE, the second index to the base station.

2. The method according to claim 1, wherein the determining, by a UE, a first index corresponding to an average transmission rate supported by a channel between the UE and the base station comprises:
determining, by the UE and based on a first relationship table, that a Channel Quality Indicator (CQI) index corresponding to the average transmission rate supported by the channel is the first index, wherein the first relationship table indicates a correspondence between the average transmission rate supported by the channel and the CQI index.

3. The method according to claim 2, wherein the determining, by the UE, a second index corresponding to a difference between an instantaneous transmission rate supported by a data stream on the channel and an average transmission rate supported by the data stream on the channel comprises:
determining, by the UE and based on a second relationship table, that a CQI index corresponding to the difference between the instantaneous transmission rate supported by the data stream on the channel and the average transmission rate supported by the data stream on the channel is the second index, wherein the second relationship table indicates a correspondence between the difference between the instantaneous transmission rate supported by the data stream on the channel and the average transmission rate supported by the data stream on the channel and the CQI index.

4. The method according to claim 3, wherein the channel comprises N data streams, wherein an eigenvalue corresponding to an $(N-1)^{th}$ data stream is greater than an eigenvalue corresponding to an $N^{th}$ data stream, wherein N is an integer greater than 1, and wherein the determining, by the UE and based on a second relationship table, that a CQI index corresponding to the difference between the instantaneous transmission rate supported by the data stream on the channel and the average transmission rate supported by the data stream on the channel is the second index comprises:

determining, by the UE and based on an index corresponding to at least one of a first data stream to the $(N-1)^{th}$ data stream of the N data streams, a fluctuation range of a difference between an instantaneous transmission rate supported by the $N^{th}$ data stream and an average transmission rate supported by the $N^{th}$ data stream; and determining, by the UE and within the fluctuation range of the difference, that a CQI index corresponding to the $N^{th}$ data stream is an index corresponding to the $N^{th}$ data stream.

5. The method according to claim 1, wherein the channel comprises a plurality of data streams, the plurality of data streams are in a one-to-one correspondence with a plurality of indexes, and the sending, by the UE, the second index to the base station comprises:

sending, by the UE, the plurality of indexes corresponding to the plurality of data streams on the channel to the base station.

6. The method according to claim 5, wherein the plurality of data streams comprise a first data stream and a second data stream, and wherein the sending, by the UE, the second index to the base station comprises:

sending, by the UE, an index corresponding to the first data stream to the base station, wherein the index corresponding to the first data stream indicates a CQI index corresponding to a difference between an instantaneous transmission rate supported by the first data stream and an average transmission rate supported by the first data stream; and sending, by the UE, an index corresponding to the second data stream to the base station, wherein the index corresponding to the second data stream indicates a CQI index corresponding to a difference between an instantaneous transmission rate supported by the second data stream and an average transmission rate supported by the second data stream.

7. The method according to claim 1, wherein a quantity of bits occupied by the second index is less than or equal to a quantity of bits occupied by the first index.

8. The method according to claim 7, wherein the quantity of bits occupied by the second index is less than 4, and the quantity of bits occupied by the first index is greater than or equal to 4.

9. The method according to claim 1, wherein a sending period of the first index is greater than a sending period of the second index.

10. A method for determining a transmission rate supported by a data stream, comprising:

receiving, by a base station, a first index sent by a user equipment (UE), wherein the first index indicates an average transmission rate supported by a channel between the UE and the base station, wherein the average transmission rate supported by the channel is an average transmission rate of one or more data streams on the channel;

receiving, by the base station, the first index re-sent by the UE, wherein the first index is re-sent in response to a change in the average transmission rate supported by the channel exceeding a preset threshold;

receiving, by the base station, a second index sent by the UE, wherein the second index indicates a difference between an instantaneous transmission rate supported by a data stream on the channel and an average transmission rate supported by the data stream on the channel; and determining, by the base station and based on the first index and the second index, the instantaneous transmission rate supported by the data stream on the channel.

11. The method according to claim 10, wherein the first index is a Channel Quality Indicator (CQI) index corresponding to the average transmission rate supported by the channel, and the second index is a CQI index corresponding to the difference between the instantaneous transmission rate supported by the data stream on the channel and the average transmission rate supported by the data stream on the channel.

12. The method according to claim 10, wherein the channel comprises a plurality of data streams, the plurality of data streams are in a one-to-one correspondence with a plurality of indexes, and the receiving, by the base station, a second index sent by the UE comprises:

receiving, by the base station, the plurality of indexes corresponding to the plurality of data streams on the channel and sent by the UE.

13. The method according to claim 12, wherein the plurality of data streams comprise a first data stream and a second data stream, and wherein the receiving, by the base station, a second index sent by the UE comprises:

receiving, by the base station, an index corresponding to the first data stream and sent by the UE, wherein the index corresponding to the first data stream indicates a CQI index corresponding to a difference between an instantaneous transmission rate supported by the first data stream and an average transmission rate supported by the first data stream; and receiving, by the base station, an index corresponding to the second data stream and sent by the UE, wherein the index corresponding to the second data stream indicates a CQI index corresponding to a difference between an instantaneous transmission rate supported by the second data stream and an average transmission rate supported by the second data stream.

14. The method according to claim 13, wherein the determining, by the base station and based on the first index and the second index, the instantaneous transmission rate supported by the data stream on the channel comprises:

determining, by the base station and based on the first index, the average transmission rate supported by the channel;

determining, by the base station and based on the average transmission rate supported by the channel, the average transmission rate supported by the first data stream and the average transmission rate supported by the second data stream;

determining, by the base station and based on the index corresponding to the first data stream, that the difference between the instantaneous transmission rate supported by the first data stream and the average transmission rate supported by the first data stream is a first difference;

determining, by the base station and based on the index corresponding to the second data stream, that the difference between the instantaneous transmission rate supported by the second data stream and the average transmission rate supported by the second data stream is a second difference;

determining, by the base station and based on the average transmission rate supported by the first data stream and the first difference, the instantaneous transmission rate supported by the first data stream; and determining, by the base station and based on the average transmission rate supported by the second data stream and the second difference, the instantaneous transmission rate supported by the second data stream.

15. The method according to claim 10, wherein a quantity of bits occupied by the second index is less than or equal to a quantity of bits occupied by the first index.

16. The method according to claim 15, wherein the quantity of bits occupied by the second index is less than 4, and the quantity of bits occupied by the first index is greater than or equal to 4.

17. The method according to claim 10, wherein a period of receiving the first index by the base station is greater than a period of receiving the second index by the base station.

* * * * *